United States Patent
Ward et al.

(10) Patent No.: US 11,179,784 B2
(45) Date of Patent: Nov. 23, 2021

(54) HOLE-SAW

(71) Applicant: Marc Steven Katz, Woodford Green (GB)

(72) Inventors: Derek Alfred Ward, Ramsgate (GB); Marc Steven Katz, Woodford Green (GB)

(73) Assignee: Marc Steven Katz, Woodford Green (GB)

( * ) Notice: Subject to any disclaimer, the term of this patent is extended or adjusted under 35 U.S.C. 154(b) by 0 days.

(21) Appl. No.: 16/485,257

(22) PCT Filed: Feb. 13, 2017

(86) PCT No.: PCT/GB2017/000018
§ 371 (c)(1),
(2) Date: Aug. 12, 2019

(87) PCT Pub. No.: WO2018/146436
PCT Pub. Date: Aug. 16, 2018

(65) Prior Publication Data
US 2019/0358716 A1    Nov. 28, 2019

(51) Int. Cl.
*B23B 51/04*    (2006.01)
(52) U.S. Cl.
CPC ...... *B23B 51/0406* (2013.01); *B23B 2226/39* (2013.01); *B23B 2228/10* (2013.01); *B23B 2228/12* (2013.01); *B23B 2260/0482* (2013.01)
(58) Field of Classification Search
CPC . B23B 51/0406; B23B 51/0473; B23B 51/05; B23B 51/08; B23B 2265/08; B23B 2265/12; B23B 2265/16; B23B 2226/39; B23B 2228/12; B28D 1/04; B28D 1/041; B28D 1/06; B28D 1/12; B28D 1/121; B28D 1/122
See application file for complete search history.

(56) References Cited

U.S. PATENT DOCUMENTS

| 3,973,862 A | * | 8/1976 | Segal ..................... B23B 31/113 408/204 |
| 5,204,393 A | * | 4/1993 | Nalepa ..................... C08K 3/36 524/101 |
| 5,435,672 A | * | 7/1995 | Hall .................... B23B 51/0453 408/204 |
| 5,651,646 A | | 7/1997 | Banke et al. |

(Continued)

FOREIGN PATENT DOCUMENTS

| EP | 1304199 A1 | 4/2003 |
| EP | 2541126 A2 | 1/2013 |

(Continued)

OTHER PUBLICATIONS

ES001D-09-2004 (Year: 2004).*

(Continued)

*Primary Examiner* — Eric A. Gates
(74) *Attorney, Agent, or Firm* — Fredrikson & Byron, P.A.

(57) ABSTRACT

A hole-saw comprises a tubular body connectable at one end to inter alia a power drill and formed at its other end with an annular array of cutting teeth. A collar is positioned at the end of the tubular body remote from the cutting teeth, the perimeter of the collar extending generally normal to and beyond the perimeter of the tubular body.

4 Claims, 1 Drawing Sheet

(56) References Cited

U.S. PATENT DOCUMENTS

| | | | |
|---|---|---|---|
| 6,357,973 B2* | 3/2002 | Chao | B23B 51/0473 408/204 |
| 7,818,867 B1* | 10/2010 | Capstran | B23B 51/0453 29/458 |
| 2004/0042861 A1 | 3/2004 | Capstran | |
| 2007/0269280 A1* | 11/2007 | Vasudeva | B23B 51/0473 408/204 |
| 2008/0131223 A1* | 6/2008 | Jauch | B26F 1/16 408/204 |
| 2009/0169317 A1* | 7/2009 | Rae | B23B 51/0473 408/204 |
| 2010/0067995 A1* | 3/2010 | Keightley | B23B 51/0426 408/68 |
| 2010/0080665 A1* | 4/2010 | Keightley | B23B 51/0433 408/204 |
| 2010/0086372 A1* | 4/2010 | Werner | B23B 51/0453 408/1 R |
| 2010/0247258 A1* | 9/2010 | Keightley | B23B 51/0473 408/204 |

FOREIGN PATENT DOCUMENTS

| | | |
|---|---|---|
| WO | 99/02919 A1 | 1/1999 |
| WO | 2015019349 A1 | 2/2015 |

OTHER PUBLICATIONS

EP2541126 English Translation (Year: 2013).*
International Search Report and Written Opinion of the ISA/EP in PCT/GB2017/000018 dated Sep. 21, 2017, 10pgs.
Comments on the Written Opinion of the ISA/EP dated Sep. 28, 2017 in PCT/GB2017/000018, 3pgs.
Search Report of the UKIPO in GB1515086.5 dated Jan. 27, 2016, 4pgs.

* cited by examiner

HOLE-SAW

RELATED APPLICATIONS

This application is a 35 U.S.C. 371 national phase filing from International Application No. PCT/GB2017/000018, filed Feb. 13, 2017, the entire contents of which are incorporated herein by reference.

FIELD OF THE INVENTION

This invention relates to a hole-saw for cutting an opening in, for example, a plasterboard wall or ceiling to receive inter alia a pipe or light fitting.

BACKGROUND TO THE INVENTION

One problem with known hole-saws or hole cutters (referred to below as hole-saws), particularly when cutting through a plasterboard wall or ceiling, is that the or each edge of the cut hole or through-hole is often damaged and requires making good with plaster and, possibly, paint. A further problem arises when drilling a hole to receive a through-pipe which requires fire rating. In such a case, a hole larger than the external diameter of the through-pipe is formed, the resulting space between the pipe and the hole subsequently needing to be filled with an intumescent mastic.

It is also the case that hole-saws quickly become blunt and require relatively frequent changing.

All of the above problems are time consuming and are overcome, or at least minimised, with hole-saws in accordance with this invention.

SUMMARY OF THE INVENTION

In one aspect, the present invention concerns a hole-saw which comprises a tubular body releasably connectable at one end to a power drill and formed at its other end with an array of cutting teeth, wherein the tubular body comprises an annular collar positioned at the end of the tubular body remote from the array of cutting teeth whose perimeter extends generally normal to and beyond the perimeter of the tubular body, the hole-saw further comprising a drive plate connectable to a power drill and including locating pins upstanding from a surface of the drive plate, recesses formed in said annular collar and positioned to receive said locating pins, and a lining of an intumescent containing material at an interior of said tubular body, wherein the tubular body is configured to be released from the drive plate once a hole forming operation is completed by removing the locating pins from said recesses to leave the hole-saw including the lining of the intumescent containing material in the formed hole with the annular collar in abutting contact with a perimeter of said formed hole.

The interior of the tubular body of the hole-saw may be at least partially lined or coated with an intumescent containing material. A piece of foam material may be positioned within the hole-saw at or towards the collar.

The collar is preferably circular and defines an annular ring which extends outwardly from the tubular body.

One or more strips of intumescent material are preferably adhered to the interior of the tubular body at a position or positions close to its end remote from the cutting teeth.

In another aspect the invention provides a hole-saw connectable to a power drill through a fitting from which the hole-saw can readily be detached, and a collar positioned at the end of the hole-saw to which the power drill is to be attached, the perimeter of said collar extending beyond the perimeter of the hole-saw.

The end of the tubular body remote from the cutting teeth is preferably covered with a foam or sponge material. This foam or sponge material may include an intumescent material.

The inner surface of the collar may include at least two recesses which coincide with the positions of locating pins which protrude from the surface of a drive plate to which a drill may be releasably connected.

The external surface of the tubular body may be at least partially lined with an abrasive material.

BRIEF DESCRIPTION OF THE DRAWINGS

The invention will now be described with reference to the accompanying diagrammatic drawings in which:—

DETAILED DESCRIPTION OF THE INVENTION

The illustrated hole-saw comprises a tubular body (10) formed at one end with an array of cutting teeth (12) and including at its other end an annular collar (14) whose periphery extends outwardly beyond the tubular body (10).

Figure 1:
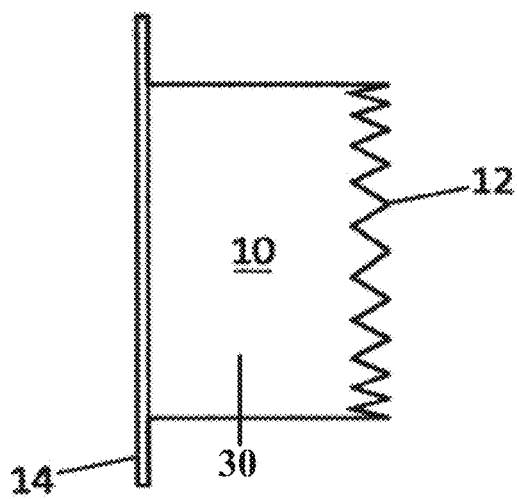
FIG. 1 is a side view of a hole-saw in accordance with the invention.
Figure 2:
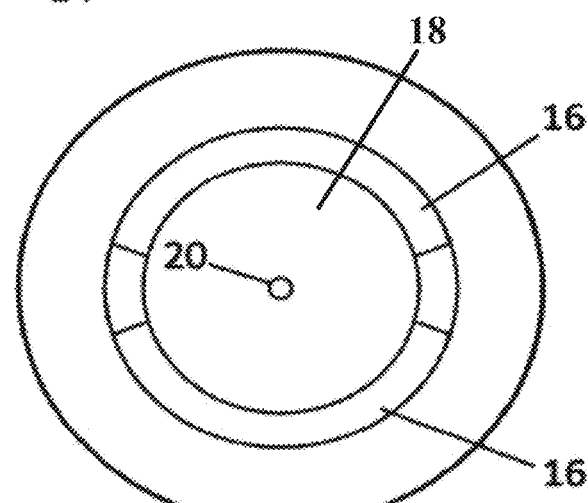
FIG. 2 is an end view from above of the hole-saw illustrated in FIG. 1.
Figure 3:
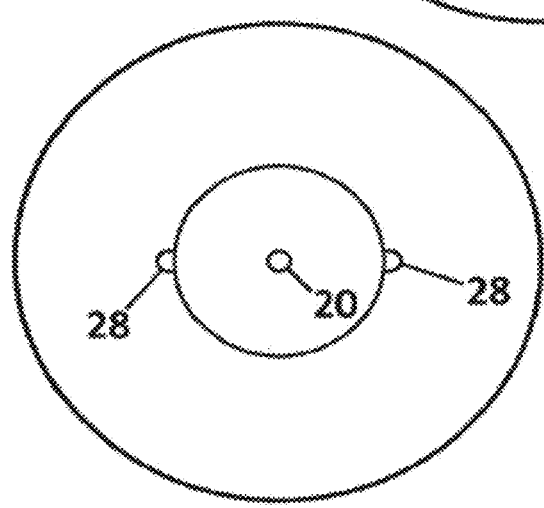
FIG. 3 is an end view from below of the hole-saw illustrated in FIG. 1.
Figure 4:
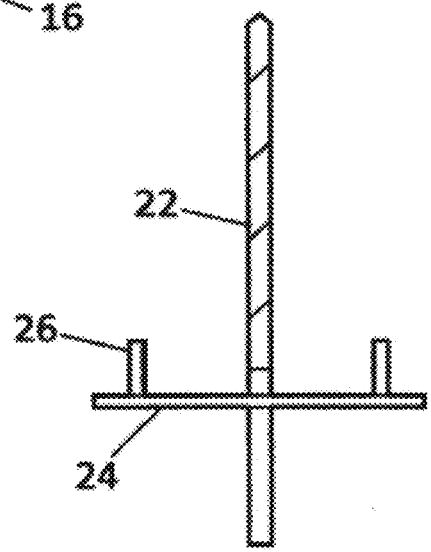
FIG. 4 is a side view of a drill and fitting for connection to the illustrated hole-saw.

As will be seen from FIG. 2, the interior of the body (10) is partially lined with sheets or pieces of intumescent material (16). The intumescent is wrapped in sheets of aluminium or silver coated foil. Alternatively, or additionally, the interior of the tubular body of the hole-saw may be coated at least partially coated with an intumescent material. The base of the tubular body (10) is covered with a sheet or piece of foam or sponge material (18) which may be coated with or include an intumescent material. A hole (20) is formed in the foam or sponge material to receive a drill (22) as shown in FIG. 4.

The drill includes or is attached to a metallic disc (24) from which are upstanding locating pins (26). The disc and locating pins define a drive plate by which the hole-saw is detachably attached to an electrically powered drill.

Two recesses (28) are formed in the inner periphery of the collar (14), these being positioned to coincide with the positions of the locating pins (26) of the drive plate disc (24).

A sheet of glass paper (30) is provided on the outer periphery of the tubular body (10). Other forms of abrasive material may be employed.

In one typical arrangement, the internal diameter of the drive plate (24) is 35 mm, the external diameter of the tubular body (10) is 55 mm and the diameter of the collar (14) is 75 mm. Typically, the hole-saw depth is 38 mm.

In use, the drill (22) with drive plate disc (24) attached is secured in the chuck of a power drill and then inserted into the tubular body (10) through the hole (20) until the pins (26) are located in the recesses (28).

The drill is then driven into the wall or ceiling at the required location whereupon the hole-saw forms the required circular through-hole or opening in the wall or ceiling.

Operation of the drill is terminated once the collar (14) comes into contact with the cut wall or ceiling to form a border to the cut hole. The glass paper (30) ensures that the hole interior is clean and smooth.

To complete the exercise, the drill is disconnected from the hole-saw simply by moving the locating pins (26) away from the holes (28) leaving the tubular body in situ within the cut hole with the face of the annular collar in abutting contact with the perimeter of the formed hole. This ensures that the edge of the cut hole is tidy and will not disintegrate further. Also, the lining or coating of intumescent material 16 is immediately in place within the cut hole should this prove to be necessary.

Other means for detachably attaching the drill to the hole-saw may be employed. These including a screw or bolt fitting, the latter including a threaded bolt to which is attached a suitably dimensional nut.

Alternatively, the drive plate (24) may include a collar projecting from its end remote from the locating pins (26) into and through which a drill or chuck may pass, the drill being held in place by a screw passing through a fitting which extends through a threaded hole formed in the side of the collar. Also, the disc may be of any shape including square and rectangular.

It will be appreciated that the foregoing is merely exemplary of hole cutters in accordance with the invention and that changes may readily be made thereto without departing from the true scope of the invention as set out in the appended claims.

The invention claimed is:

1. A hole-saw which comprises an open-ended tubular body releasably connectable at one open end to a power drill and formed at its other open end with an array of cutting teeth, wherein the open-ended tubular body comprises an annular collar positioned at the one open end of the open-ended tubular body remote from the array of cutting teeth whose perimeter extends generally normal to and beyond the perimeter of the open-ended tubular body in a direction normal to the open-ended tubular body, the hole-saw further comprising a drive plate connectable to a power drill and including locating pins upstanding from a surface of the drive plate, recesses formed in said annular collar and positioned to receive said locating pins, wherein when the locating pins are at the recesses is when the drive plate is locked to the hole-saw, and a lining of an intumescent containing material at an interior of said open-ended tubular body, wherein the open-ended tubular body is configured such that on release of the open-ended tubular body from the drive plate following completion of a hole forming operation the hole-saw including the lining of the intumescent containing material remains in a formed hole resulting from the hole forming operation.

2. The hole-saw as claimed in claim 1 wherein the inner surface of the annular collar includes at least two recesses which coincide with the positions of the locating pins which protrude from the surface of the drive plate.

3. The hole-saw as claimed in claim 1 wherein the external surface of the open-ended tubular body is at least partially lined with an abrasive material.

4. A hole-saw which comprises an open-ended tubular body releasably connectable at one open end to a power drill and formed at its other open end with an array of cutting teeth, wherein the open-ended tubular body comprises an annular collar positioned at the open end of the open-ended tubular body remote from the array of cutting teeth whose perimeter extends generally normal to and beyond the perimeter of the open-ended tubular body in a direction normal to the open-ended tubular body, the hole-saw further comprising a drive plate connectable to a power drill and including locating pins upstanding from a surface of the drive plate, recesses formed in said annular collar and positioned to receive said locating pins, wherein when the locating pins are at the recesses is when the drive plate is locked to the hole-saw, and a lining of an intumescent containing material at an interior of said open-ended tubular body, wherein the open-ended tubular body is configured such that on release of the open-ended tubular body from the drive plate following completion of a hole forming operation the hole-saw including the lining of the intumescent containing material remains in a formed hole resulting from the hole forming operation, and wherein a piece of sponge material coated with intumescent material is positioned across the end of the tubular body remote from the cutting teeth and is formed with an opening through which a drill of the power tool can pass.

* * * * *